(No Model.)
G. A. FOWLER.
THILL COUPLING.
No. 533,986. Patented Feb. 12, 1895.
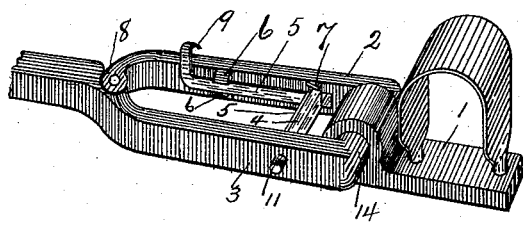
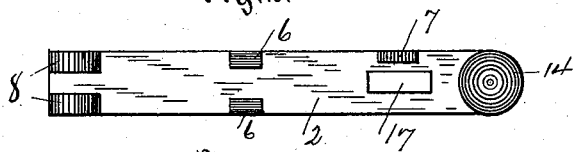
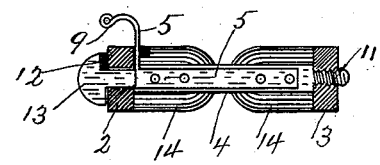
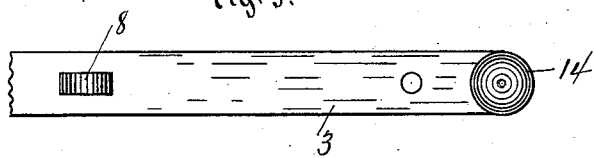
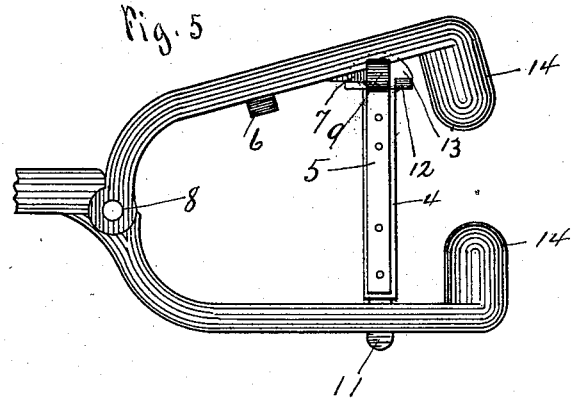
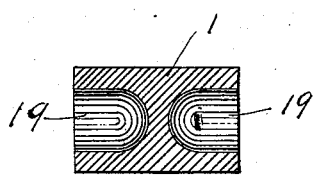
Witnesses
S. Ed. Moore
James T. Dale
Inventor.
George A. Fowler.
By N. B. Hagin.
Atty.

UNITED STATES PATENT OFFICE.

GEORGE A. FOWLER, OF WICHITA, KANSAS, ASSIGNOR OF ONE-HALF TO JAMES M. FOWLER, OF SAME PLACE.

THILL-COUPLING.

SPECIFICATION forming part of Letters Patent No. 533,986, dated February 12, 1895.

Application filed November 13, 1894. Serial No. 528,647. (No model.)

*To all whom it may concern:*

Be it known that I, GEORGE A. FOWLER, a citizen of the United States of America, residing at Wichita, in the county of Sedgwick and State of Kansas, have invented certain new and useful Improvements in Thill-Couplings, of which the following is a specification, reference being had therein to the accompanying drawings and the figures of reference thereon, forming a part of this specification, in which—

Figure 1, is a perspective view of my improved thill coupler. Fig. 2, is a side view of one of the arms of the coupler. Fig. 3, is a like view of the opposite arm. Fig. 4, is a sectional view of the coupler, showing the cross bolt, and spring, and Fig. 5, is a sectional detail view of the clip. Fig. 6, is a sectional view of the clip showing the thill coupler bearings.

This invention relates to certain improvements in that class of thill couplers, wherein the slack, caused from wear, can be taken up, thus preventing rattling, and in which the thills can quickly and easily be detached from the vehicle, and consists in arms pivotally held together by means of a bolt removably held by a spring, said arms engaging the clip by lugs having round ends.

Referring to the drawings 1 represents an axle clip. 2 is one arm of the thill coupling. 3 is the opposite arm of the same. 4 is a cross bolt connecting the two arms. 5 is a spring for holding said bolt in place, having the bent end 9 for taking hold of, to remove said spring from the keepers 6, when it is desired to remove the said bolt 4.

7 is an incline lug on the inside of the arm 2, and above the bolt 4, for the purpose of engaging the spring 5 when the said spring is raised up to a horizontal position. Thus through the medium of the hinge 8 the arms 2 and 3 will spread, allowing the head 13 of the bolt 12 to pass through the opening 17 in the said arm 2, thus removing the lugs 14 from their bearings 19. Should the lugs 14 and the bearing 19 become worn, so as to allow the thills to rattle, they can be tightened by drawing the lugs 14 closer together by shortening said bolt 4 between the arms 2 and 3, through the medium of the threaded end 11. The head 13 of the bolt 4 is provided with the beveled surfaces 12, (see Figs. 4 and 5) for the purpose of acting as a wedge when drawing the lugs 14 tight together into the bearings 19. Said bearings may be provided with washers. It will be seen that the thills can be very easily and quickly removed or replaced by this means, and in case of a horse running away, the driver can reach the portion 9 of the spring 5, and raise it up to the lug 7 which at the same time will bring the long way of the head 13 of the bolt 4 in line with the long way of the opening 17 of the arm 2, when the arms 2 and 3 will spread, drawing the lugs 14 out of their bearings 19, which will separate the thills from the vehicle.

Having thus described my invention, what I claim as new and useful, and desire to secure by Letters Patent, is as follows:

In the herein described thill coupling, the combination of the clip 1, the arms 2 and 3 hinged together; the arms 2 having the keepers 6, the lug 7 and the opening 17; the bolt 4; and the spring 5 for holding said bolt in position, substantially as shown and described.

GEORGE A. FOWLER.

Witnesses:
C. S. CALDWELL,
ROBT. M. PIATT.